(12) United States Patent
Maguire et al.

(10) Patent No.: US 7,604,896 B2
(45) Date of Patent: Oct. 20, 2009

(54) HIGH VOLTAGE BATTERY ASSEMBLY FOR A MOTOR VEHICLE

(75) Inventors: Patrick Maguire, Ann Arbor, MI (US); Ronald Edler, Livonia, MI (US); Hisham Younis, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 702 days.

(21) Appl. No.: 11/161,191

(22) Filed: Jul. 26, 2005

(65) Prior Publication Data

US 2006/0208698 A1 Sep. 21, 2006

Related U.S. Application Data

(60) Provisional application No. 60/662,418, filed on Mar. 16, 2005.

(51) Int. Cl.
*H01M 2/20* (2006.01)

(52) U.S. Cl. .................. 429/160; 429/158; 429/159

(58) Field of Classification Search ............ 429/158, 429/159, 9, 7; 439/668, 500, 32
See application file for complete search history.

(56) References Cited

U.S. PATENT DOCUMENTS

| | | | |
|---|---|---|---|
| 3,356,980 A | 12/1967 | Roberts | |
| 3,718,881 A | 2/1973 | Szanny | |
| 3,976,854 A | 8/1976 | Ishikawa et al. | |
| 4,094,483 A | 6/1978 | Busch | |
| 4,522,898 A | 6/1985 | Esrom | |
| 4,554,221 A | 11/1985 | Schmid | |
| 4,572,878 A | 2/1986 | Daugherty | |
| 4,883,726 A | 11/1989 | Peled et al. | |
| 4,959,633 A | 9/1990 | Kiraly et al. | |
| 5,204,608 A | 4/1993 | Koenck | |
| 5,374,490 A | 12/1994 | Aldecoa | |
| 5,378,552 A | 1/1995 | Dixon, Jr. | |
| 5,391,972 A | 2/1995 | Gardner et al. | |
| 5,456,994 A | 10/1995 | Mita | |
| 5,558,950 A | 9/1996 | Ovshinsky et al. | |
| 5,654,870 A | * | 8/1997 | Havener ............ 361/600 |
| 5,667,907 A | 9/1997 | Audit et al. | |
| 5,680,030 A | 10/1997 | Kadouchi et al. | |
| 5,689,173 A | 11/1997 | Oosaki et al. | |
| 5,736,272 A | 4/1998 | Veenstra et al. | |
| 5,818,198 A | 10/1998 | Mito et al. | |
| 5,830,599 A | 11/1998 | Okamoto et al. | |
| 5,879,831 A | 3/1999 | Ovshinsky et al. | |

(Continued)

FOREIGN PATENT DOCUMENTS

FR 2 827 428 1/2003

(Continued)

*Primary Examiner*—Patrick Ryan
*Assistant Examiner*—Ashley Kwon
(74) *Attorney, Agent, or Firm*—David B. Kelley; Brooks Kushman P. C.

(57) ABSTRACT

A battery assembly for a vehicle. The battery assembly includes a plurality of voltage modules and a connection device having conductive and nonconductive portions. The conductive portion contacts the terminals of at least two voltage modules when disposed in a first position. The nonconductive portion may contact at least one terminal of the at least two voltage modules when disposed in a second position.

20 Claims, 4 Drawing Sheets

U.S. PATENT DOCUMENTS

| | | | |
|---|---|---|---|
| 5,963,423 A | 10/1999 | Ikeda | |
| 5,977,746 A | 11/1999 | Hershberger et al. | |
| 5,993,992 A | 11/1999 | Field et al. | |
| 6,023,146 A | 2/2000 | Casale et al. | |
| 6,097,173 A | 8/2000 | Bryant, Jr. | |
| 6,097,193 A | 8/2000 | Bramwell | |
| 6,111,387 A | 8/2000 | Kouzu et al. | |
| 6,174,618 B1 | 1/2001 | Nishiyama et al. | |
| 6,211,645 B1 | 4/2001 | Kouzu et al. | |
| 6,211,646 B1 | 4/2001 | Kouzu et al. | |
| 6,265,091 B1 | 7/2001 | Pierson et al. | |
| 6,270,920 B1 | 8/2001 | Nakanishi et al. | |
| 6,275,003 B1 | 8/2001 | Marukawa et al. | |
| 6,326,101 B1 | 12/2001 | White et al. | |
| 6,330,925 B1 | 12/2001 | Ovshinsky et al. | |
| 6,335,116 B1 | 1/2002 | Yamane et al. | |
| 6,340,877 B1 | 1/2002 | Mita et al. | |
| 6,372,377 B1 | 4/2002 | Ovshinsky et al. | |
| 6,399,238 B1 | 6/2002 | Oweis et al. | |
| 6,410,184 B1 | 6/2002 | Horiuchi et al. | |
| 6,422,027 B1 | 7/2002 | Coates, Jr. et al. | |
| 6,428,925 B1 | 8/2002 | Takeno et al. | |
| 6,439,932 B1 * | 8/2002 | Ripolone | 439/668 |
| 6,448,741 B1 | 9/2002 | Inui et al. | |
| 6,455,190 B1 | 9/2002 | Inoue et al. | |
| 6,465,986 B1 | 10/2002 | Haba | |
| 6,472,098 B1 | 10/2002 | Sawada et al. | |
| 6,479,185 B1 | 11/2002 | Hilderbrand et al. | |
| 6,479,187 B1 | 11/2002 | Takasaki et al. | |
| 6,489,747 B2 | 12/2002 | Abe | |
| 6,500,581 B2 | 12/2002 | White et al. | |
| 6,504,342 B2 | 1/2003 | Inui et al. | |
| 6,517,966 B1 | 2/2003 | Marukawa et al. | |
| 6,537,694 B1 | 3/2003 | Sugiura et al. | |
| 6,551,741 B1 | 4/2003 | Hamada et al. | |
| 6,557,655 B2 | 5/2003 | Ovshinsky et al. | |
| 6,566,005 B1 | 5/2003 | Shimma et al. | |
| 6,569,556 B2 | 5/2003 | Zhou et al. | |
| 6,569,561 B1 | 5/2003 | Kimura et al. | |
| 6,579,642 B2 | 6/2003 | Yamane et al. | |
| 6,599,660 B2 | 7/2003 | Oda et al. | |
| 6,606,245 B2 | 8/2003 | Oda et al. | |
| 6,610,439 B1 | 8/2003 | Kimoto et al. | |
| 6,627,345 B1 | 9/2003 | Zemlok et al. | |
| 6,632,560 B1 | 10/2003 | Zhou et al. | |
| 6,636,016 B2 | 10/2003 | Tanaka et al. | |
| 6,641,950 B2 | 11/2003 | White et al. | |
| 6,645,664 B2 | 11/2003 | Nakanishi et al. | |
| 6,692,864 B1 | 2/2004 | Dansui et al. | |
| 6,780,538 B2 | 8/2004 | Hamada et al. | |
| 6,783,886 B1 | 8/2004 | Sakakibara et al. | |
| 6,818,343 B1 | 11/2004 | Kimoto et al. | |
| 6,837,321 B2 | 1/2005 | Ovshinsky et al. | |
| 6,858,344 B2 | 2/2005 | Marukawa et al. | |
| 6,861,821 B2 | 3/2005 | Masumoto et al. | |
| 6,878,485 B2 | 4/2005 | Ovshinsky et al. | |
| 6,890,683 B2 | 5/2005 | Asahina et al. | |
| 6,913,852 B2 | 7/2005 | Nakanishi et al. | |
| 7,108,940 B2 * | 9/2006 | Sharrow et al. | 429/97 |
| 7,422,293 B2 * | 9/2008 | Chorian et al. | 303/20 |
| 2001/0026886 A1 | 10/2001 | Inui et al. | |
| 2001/0046624 A1 | 11/2001 | Goto et al. | |
| 2002/0022159 A1 * | 2/2002 | Pierson et al. | 429/1 |
| 2002/0028375 A1 | 3/2002 | Morishita et al. | |
| 2002/0076580 A1 | 6/2002 | Tudron | |
| 2002/0182480 A1 | 12/2002 | Hanauer et al. | |
| 2002/0187390 A1 | 12/2002 | Kimoto et al. | |
| 2003/0017383 A1 | 1/2003 | Ura et al. | |
| 2003/0017387 A1 | 1/2003 | Marukawa et al. | |
| 2003/0027037 A1 | 2/2003 | Moores, Jr. et al. | |
| 2003/0054230 A1 | 3/2003 | Al-Hallaj et al. | |
| 2003/0082439 A1 | 5/2003 | Sakakibara | |
| 2003/0091896 A1 | 5/2003 | Watanabe et al. | |
| 2003/0096160 A1 | 5/2003 | Sugiura et al. | |
| 2003/0118898 A1 | 6/2003 | Kimura et al. | |
| 2003/0124419 A1 | 7/2003 | Ito et al. | |
| 2003/0134189 A1 | 7/2003 | Kanai et al. | |
| 2003/0141842 A1 | 7/2003 | Izawa et al. | |
| 2003/0143881 A1 * | 7/2003 | Ferranti et al. | 439/213 |
| 2003/0227275 A1 | 12/2003 | Kishi et al. | |
| 2004/0058233 A1 | 3/2004 | Hamada et al. | |
| 2004/0070367 A1 | 4/2004 | Schadoffsky et al. | |
| 2004/0081885 A1 | 4/2004 | Ziegler et al. | |
| 2004/0131927 A1 | 7/2004 | Holland et al. | |
| 2004/0137313 A1 | 7/2004 | Jaura et al. | |
| 2004/0137323 A1 | 7/2004 | Sato | |
| 2004/0197642 A1 | 10/2004 | Sato | |
| 2005/0053829 A1 | 3/2005 | Han | |
| 2005/0053831 A1 | 3/2005 | Katzenberger et al. | |
| 2005/0058892 A1 | 3/2005 | Ovshinsky et al. | |
| 2005/0074655 A1 | 4/2005 | Ariyoshi et al. | |
| 2005/0079408 A1 | 4/2005 | Hirano | |
| 2005/0095499 A1 | 5/2005 | Kanai et al. | |
| 2005/0100783 A1 | 5/2005 | Ro et al. | |
| 2005/0130033 A1 | 6/2005 | Iwamura et al. | |
| 2006/0028183 A1 | 2/2006 | Izawa et al. | |

FOREIGN PATENT DOCUMENTS

| | | |
|---|---|---|
| JP | 9106836 | 4/1997 |

* cited by examiner

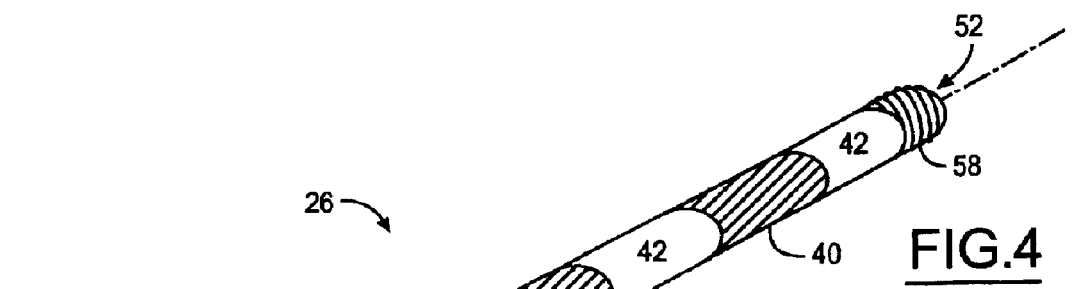
FIG.4
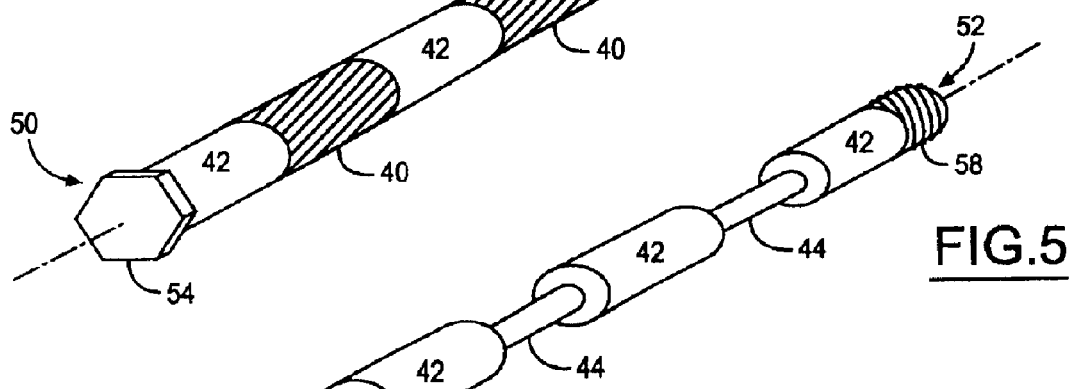
FIG.5
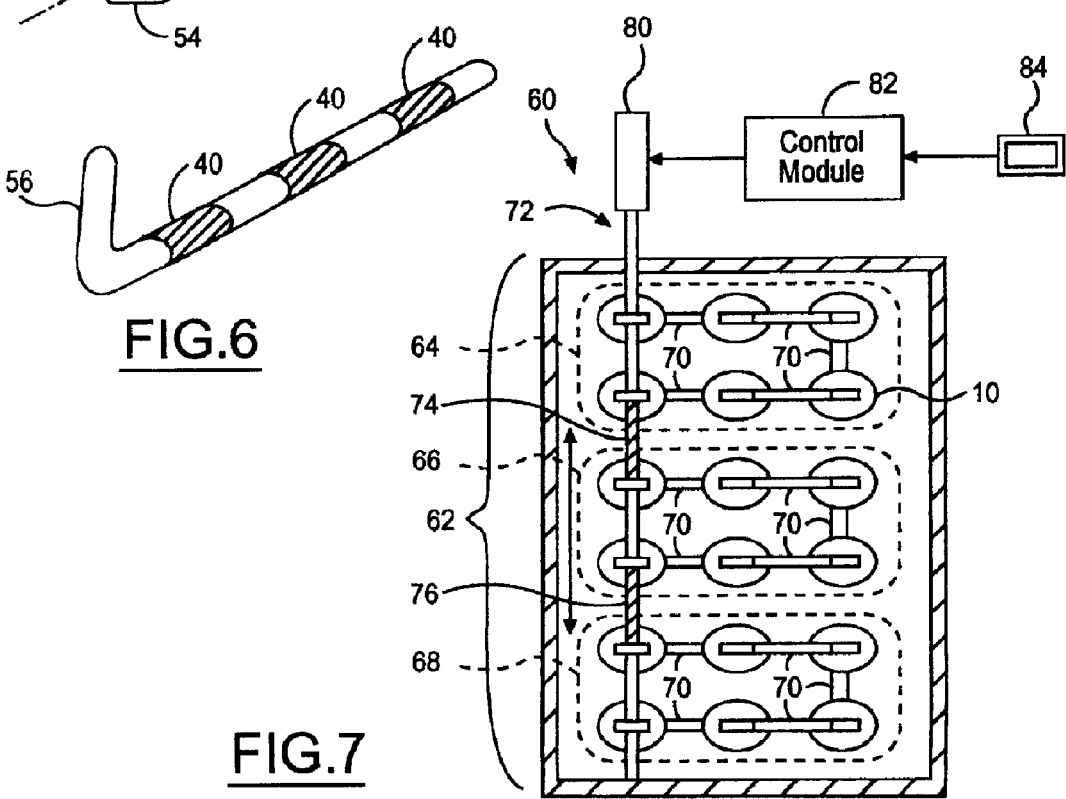
FIG.6
FIG.7

HIGH VOLTAGE BATTERY ASSEMBLY FOR A MOTOR VEHICLE

CROSS-REFERENCE TO RELATED APPLICATIONS

This application claims the benefit of U.S. provisional application Ser. No. 60/662,418 filed Mar. 16, 2005.

BACKGROUND OF THE INVENTION

1. Field of the Invention

The present invention relates generally to a battery assembly, and more specifically to a high voltage battery assembly for a motor vehicle.

2. Background Art

Motor vehicles, such as electric or hybrid electric vehicles, may include a battery configured to provide a high level of voltage. Previously, high voltage batteries or vehicles having a high voltage battery were transported to an original equipment manufacturer for maintenance and servicing.

Before applicant's invention, there was a need for a battery assembly that could be quickly and easily reconfigured to supply a reduced output voltage level. In addition, there was a need for a battery assembly that could be manually reconfigured to facilitate servicing or automatically reconfigured during vehicle operation. In addition, there was the need for a battery assembly that could be serviced by a vehicle dealership to reduce service time and cost. Problems noted above and other problems are addressed by applicant's invention as summarized below.

SUMMARY OF THE INVENTION

In at least one embodiment of the present invention, a battery assembly is provided. The battery assembly includes a plurality of voltage modules that each have a terminal and a connection device having conductive and nonconductive portions. The conductive portion contacts the terminals of at least two voltage modules when disposed in a first position. The nonconductive portion contacts at least one member of the at least two voltage modules when disposed in a second position.

The conductive and nonconductive portions may be coaxially disposed. The conductive portion may have a generally cylindrical configuration and may be disposed around a nonconductive core. The conductive portion may be disposed adjacent to a plurality of nonconductive portions.

The connection device may include first and second ends. The first end may have a tool engagement feature. The second end may have a retention feature. The first end may be coupled to an actuator adapted to move the connection device between the first and second positions in response to an actuation signal.

The battery assembly may include a housing for receiving the plurality of voltage modules. The housing may include first and second apertures. The first and second ends of the connection device may be disposed proximate the first and second apertures, respectively, when the connection device is in the first position.

The housing may have a compartment that receives the plurality of voltage modules. The connection device may cover the compartment and the conductive portion may be disposed proximate a surface of the nonconductive portion of the connection device that faces the compartment.

The conductive portion may have a non-planar configuration for providing a biasing force against the terminals of the at least two voltage modules when disposed in the first position.

In at least one other embodiment of the present invention, a battery assembly for a vehicle is provided. The battery assembly includes a first set of voltage modules connected in series, a second set of voltage modules connected in series, a housing for receiving the first and second sets of voltage modules, and a connection device. The housing has an end surface. The connection device is configured to engage the end surface and has a conductive portion disposed proximate a nonconductive interior surface. The first and second sets of voltage modules are connected in series when the conductive portion contacts a member of the first set and a member of the second set.

The first set of voltage modules may not be connected in series with the second set of voltage modules when the connection device is spaced apart from the end surface.

The connection device may be configured to move along the end surface between a first position in which the conductive portion connects the first and second sets of voltage modules in series and a second position in which the conductive portion is spaced apart from at least one of the first and second sets of voltage modules.

A section of the conductive portion may protrude from the nonconductive interior surface. The conductive portion may have a corrugated configuration for providing a biasing force against members of the first and second sets of voltage modules when the conductive portion contacts a member of the first set and a member of the second set.

In at least one other embodiment of the present invention, a high voltage battery assembly for a vehicle is provided. The high voltage battery assembly includes a housing, first and second sets of voltage modules, and a connection device. The first and second sets of voltage modules are at least partially disposed in the housing. The members of the first set are connected in series. The members of the second set are connected in series. The connection device has coaxial conductive and nonconductive portions at least partially disposed in the housing. The connection device moves linearly between a first position in which the conductive portion connects the first and second sets of voltage modules in series and a second position in which the conductive portion does not connect the first and second sets of voltage modules in series.

A member of the first set may include a first terminal having a first terminal aperture. A member of the second set may include a second terminal having a second terminal aperture. The connection device may be moveably disposed in the first and second terminal apertures. The nonconductive portion may be disposed proximate at least one of the first and second terminals when disposed in the second position.

The connection device may include a first end. The first end may be coupled to an actuator or have a tool engagement feature.

BRIEF DESCRIPTION OF THE DRAWINGS

FIG. 4 is a perspective view of one embodiment of the connection device.

FIG. 5 is a perspective view of one embodiment of a nonconductive portion of the connection device.

FIG. 6 is a perspective view of another embodiment of the connection device.

FIG. 7 is a section view of a battery assembly having an actuator for positioning a connection device.

DETAILED DESCRIPTION

Figure 1:
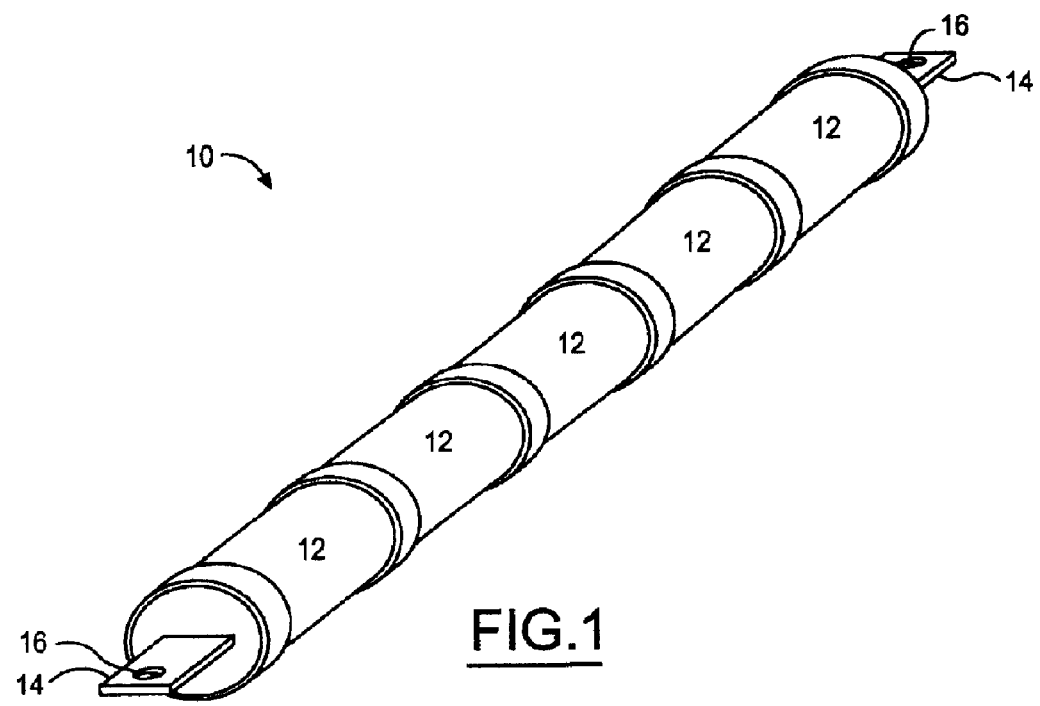
FIG. 1 is a perspective view of a voltage module.

Referring to FIG. 1, an exemplary embodiment of a voltage module 10 is shown. The voltage module 10 is configured to provide electrical voltage to a vehicle electrical system or vehicle electrical system component. The voltage module 10 may have any suitable configuration. For example, the voltage module 10 may include one or more cells and one or more terminals. In the embodiment shown in FIG. 1, the voltage module 10 includes five cells 12 connected in series and two terminals 14.

The cells 12 may have any suitable configuration and may be of any suitable type, such as nickel-metal hydride (Ni—MH), nickel-iron (Ni—Fe), nickel-cadmium (Ni—Cd), lead acid, zinc bromine (Zn—Br), sodium nickel chloride, sodium sulfur, or lithium based. Each cell 12 may provide a same or different nominal level of voltage. In one embodiment, each cell 12 may provide a nominal voltage level of approximately 1.3 volts. Optionally, the cells 12 may be disposed in a sleeve or any suitable containment device. In the embodiment shown, the cells 12 are coaxially arranged.

The terminals 14 are configured to electrically connect the voltage module 10 to at least one another component. In the embodiment shown, the terminals 14 are disposed at opposite ends of the voltage module 10. The terminals may be made of an electrically conductive material, such as a metal, and may have any suitable configuration. In the embodiment shown, each terminal 14 has a generally planar configuration and includes an opening 16, such as a slot or aperture. Alternatively, one or more terminals 14 may be configured without an opening in various embodiments of the present invention.

Figure 2:
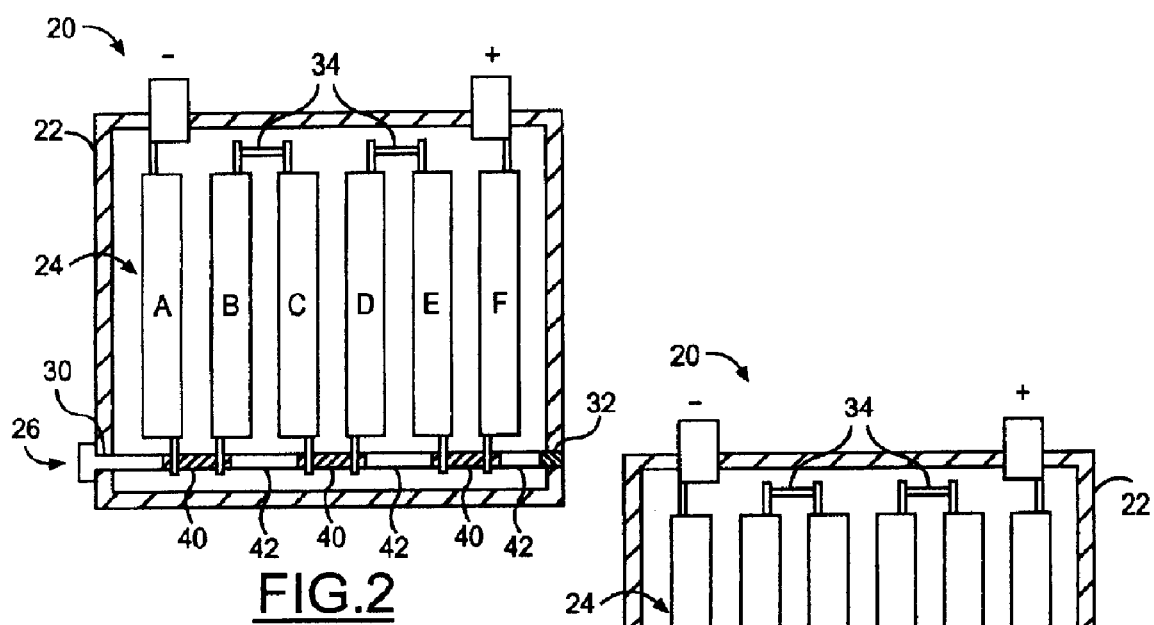
FIG. 2 is a section view of a battery assembly having a plurality of voltage modules and a connection device disposed in a first position.

Referring to FIG. 2, an exemplary battery assembly 20 is shown. The battery assembly 20 may be a high voltage battery configured to provide an elevated level of voltage (e.g, greater than 50 to 60 volts), such as that which may be used in an electric, hybrid electric, or fuel cell vehicle. A high voltage battery may include various parts and subsystems for containing, controlling, and protecting the battery assembly and associated components. In the embodiment shown, the battery assembly 20 includes a housing 22, a set of voltage modules 24, and a connection device 26.

The housing 22 is configured to receive at least a portion of the set of voltage modules 24. The housing 22 may be made of any suitable material, such as a metal or a polymeric material. In at least one embodiment, the housing 22 may include one or more apertures for receiving a portion of the connection device 26. In the embodiment shown in FIGS. 2 and 3, the housing 22 includes a first aperture 30 and a second aperture 32. Optionally, the first and/or second apertures 32 may be threaded.

The set of voltage modules 24 may be selectively connected in series to provide a nominal battery voltage level. Any suitable number of voltage modules may be provided in any suitable configuration. For example, a nominal output voltage level of approximately 325 volts may be attained by combining fifty 6.5 volt voltage modules in series. For simplicity, the battery assembly 20 shown in FIGS. 2 and 3 includes six voltage modules 10, designated by letters A through F.

Voltage modules A and F may be connected to negative (−) and positive terminals (+), respectively. Voltage modules B and C and voltage modules D and E may be connected in series with electrically conductive couplings 34. The conductive couplings 34 may be made of any suitable material, such as a metal. Moreover, the conductive couplings 34 may be fixedly positioned relative to their associated voltage modules.

The connection device 26 is adapted to selectively connect one or more voltage modules in series. The connection device 26 may have any suitable configuration and may include one or more conductive portions 40 and one or more insulating or nonconductive portions 42. The conductive portions 40 and optionally the nonconductive portions 42 may be configured to contact the terminals 14 of one or more voltage modules. In the embodiment shown, the connection device 26 extends through a plurality of terminal openings 16 such that the conductive and nonconductive portions 40,42 may selectively contact one or more terminals 14. In addition, the connection device 26 or a portion thereof may be disposed in the housing 22.

Figure 3:
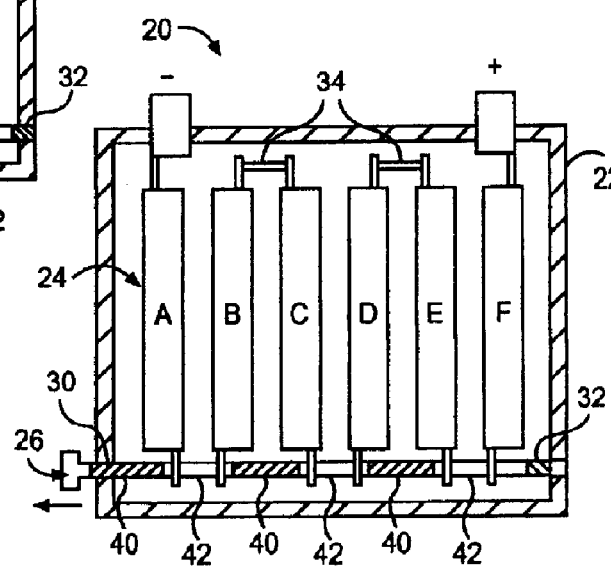
FIG. 3 is a section view of the battery assembly shown in FIG. 2 with the connection device disposed in a second position.

In the embodiment shown in FIGS. 2 and 3, the connection device 26 is adapted to move between a first position shown in FIG. 2 in which each conductive portion 40 connects voltage modules in series and a second position shown in FIG. 3 in which each conductive portion 40 does not connect voltage modules in series. More particularly, a conductive portion 40 may contact at least two voltage modules when disposed in the first position and may contact less than two voltage modules when disposed in the second position. In the embodiment shown in FIG. 2, different conductive portions connect voltage modules A and B, voltage modules C and D, and voltage modules E and F when disposed in the first position.

Referring to FIG. 4, the connection device 26 is shown in more detail. In this embodiment, the conductive portions 40 and nonconductive portions 42 have generally cylindrical configurations and are coaxially arranged. Moreover, the conductive portions 40 are isolated from each other to inhibit the conduction of electricity. The conductive portions 40 may be made of any suitable material, such as a metal like a copper containing alloy. Similarly, the nonconductive portions 42 may be made of any suitable material, such as a polymeric material. The conductive and nonconductive portions 40,42 may have similar shapes and/or surface areas as shown in FIG. 4 or may have different shapes and/or surface areas.

Referring to FIG. 5, part of one embodiment of a connection device is shown with the conductive portions removed. In this embodiment, pairs of nonconductive portions 42 are interconnected by a core portion 44. The nonconductive portions 42 and core portions 44 may be integrally formed or may be assembled in any suitable manner, such as with fasteners or an adhesive. A conductive portion 40 may be wrapped or formed around each core portion 44. Alternatively, some or all of the core portions 44 may be omitted and the conductive and nonconductive portions 40,42 may be attached to each other.

The connection device 26 may include a first end 50 and a second end 52. The first end 50 may be provided with a tool engagement feature 54. The tool engagement feature 54 may have any suitable configuration, such as a male configuration for engaging a tool like a socket or wrench, or a female configuration for engaging a tool like a screwdriver or drive bit. In the embodiment shown, the tool engagement feature 54 has a hexagonal configuration. The tool engagement feature 54 may be spaced apart from the housing 22 when the connection device 26 is disposed in the second position. Alternatively, the first end 50 may be include a manual actuation feature 56 like a knob, lever, or handle as shown in FIG. 6 or may be connected to an automatic actuation device, such as an actuator as is described in more detail below.

The second end 52 may include any suitable retention feature, such as a tab or threaded section 58 for engaging mating threads of the second aperture 32 of the housing 22. In the embodiment shown, the second end 52 has a male configuration and the second aperture 32 has a female configuration. The present invention also contemplates embodiments where the second end 52 has a female configuration and the housing 22 has a mating feature with a male configuration. Alternatively, the second end 52 may be provided without threads, may be coupled to an actuator, or may be spaced apart from the housing 22.

Referring to FIG. 7, another embodiment of a battery assembly 60 is shown. In this embodiment, the battery assembly 60 includes an array 62 of voltage modules. The array 62 may be organized into sets of voltage modules, with each set having a same or different number of members. In this exemplary embodiment, the array 62 is organized into a first set 64, a second set 66, and a third set 68, denoted by the dashed lines. In the embodiment shown, the first, second, and third sets 64,66,68 each include six voltage modules connected in series with conductive couplings 70. A connection device 72 is configured to selectively connect one or more sets in series. More particularly, the connection device 72 may be configured similar to the embodiment shown in FIG. 4 and may be adapted to move in the direction shown by the arrowed line between a first position in which one or more conductive portions connect two sets of voltage modules in series and a second position in which one or more conductive portions do not connect at least two sets of voltage modules in series. In the embodiment shown, the first and second sets 64,66 are connected in series by a first conductive portion 74 and the second and third sets 66,68 are connected in series by a second conductive portion 76 when the connection device 72 is disposed in the first position as shown in FIG. 7.

The connection device 72 may be automatically or manually actuated between the first and second positions. In the embodiment shown, an actuator 80 is coupled to the connection device 72 and is adapted to move the connection device 72 between the first and second positions. The actuator 80 may be of any suitable type, such as a solenoid. The actuator 80 may receive a control signal from another component, such as a control module 82 and/or an input device 84 like a button, sensor, or other vehicle component or system. For example, the control signal may be provided by an impact sensor adapted to detect a collision with the vehicle or a pre-collision detection system, such as lidar, radar, or vision-based system. More particularly, the actuator 80 may move the connection device 72 from the first position toward the second position when a potential or actual vehicle impact event is detected.

Figure 8:
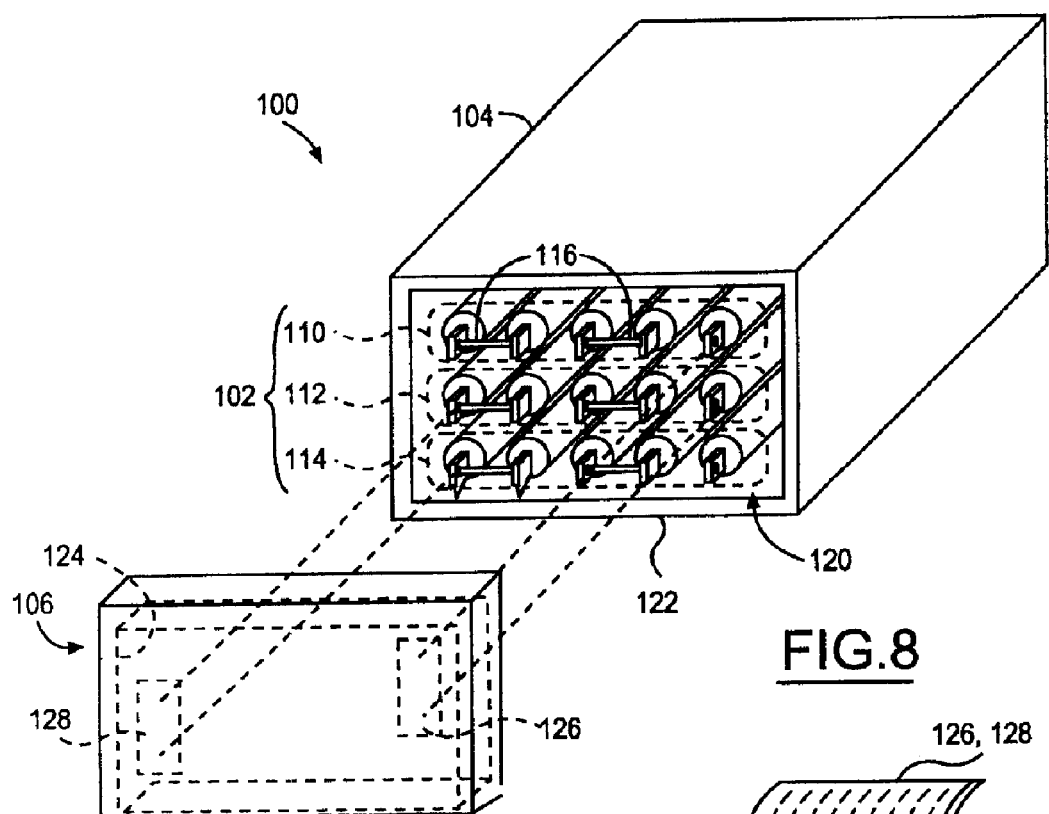
FIG. 8 is a partially exploded perspective view of another embodiment of the battery assembly including a connection device having conductive and nonconductive portions.

Referring to FIG. 8, another embodiment of a battery assembly is shown. In this embodiment, the battery assembly 100 includes an array 102 of voltage modules, a housing 104, and a connection device 106.

The array 102 may be organized into sets of voltage modules as previously discussed. In this exemplary embodiment, the array 102 is organized into a first set 110, a second set 112, and a third set 114, as denoted by the dashed lines. In the embodiment shown, the first, second, and third sets 110,112, 114 each include five voltage modules connected in series with conductive couplings 116 (the conductive couplings hidden by the housing 104 are not shown for clarity).

The housing 104 may include a compartment 120 for receiving at least a portion of the first, second, and third sets 110,112,114. An end surface 122 is disposed proximate the compartment 120.

The connection device 106 is configured to selectively connect one or more sets in series. The connection device 106 may be configured as a cover that is configured to engage the end surface 122 and/or at least partially conceal the compartment 120. More specifically, the connection device 106 includes at least one conductive portion disposed proximate a nonconductive interior surface 124. In the embodiment shown in FIG. 8, the connection device 106 includes first and second conductive portions 126,128.

Figure 9:
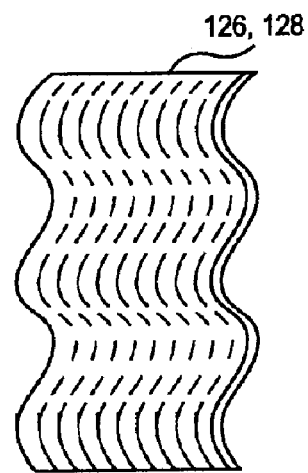
FIG. 9 is a perspective view of another embodiment of the conductive portion of a connection device.
Figure 10:
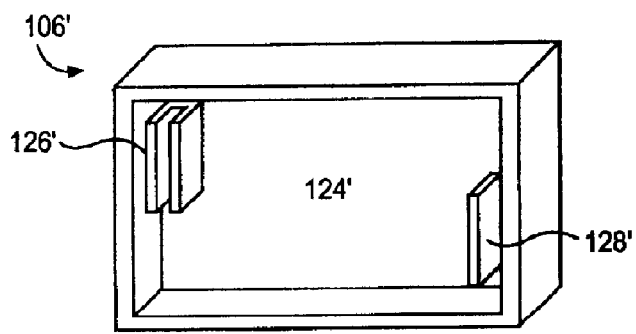
FIG. 10 is a perspective view of another embodiment of a connection device.

The conductive portions 126,128 may have any suitable configuration. For example, the conductive portions 126,128 may be configured as a busbar having a generally planar configuration. Alternatively, the conductive portions 126,128 may have a non-planar configuration. For instance, one or more conductive portions may have a corrugated configuration as shown in FIG. 9 that is configured to provide a biasing force against one or more associated voltage modules to accommodate dimensional tolerances and to inhibit intermittent electrical connections. Alternatively, a connection device 106' may have an interior surface 124' and conductive portions 126',128' with male and/or female configurations disposed proximate the interior surface 124' as shown in FIG. 10. In addition, a connection device 106" may be provided having an interior surface 124" and a conductive portion that combines one or more non-planar surfaces with a male or female configuration as shown in FIG. 10. The connection device 106" may include a conductive portion 126" configured as a clip and may include one or more non-planar or corrugated surfaces that provide a biasing force as previously discussed.

The conductive portions 126,126',126",128,128' may be integrally formed with or attached to the interior surface 124,124',124" in any suitable manner, such as with fasteners or an adhesive.

Referring again to FIG. 8, the first and second sets 110,112 are connected in series by the first conductive portion 126 and the second and third sets 112,114 are connected in series by the second conductive portion 128 when the connection device 106 is disposed proximate the end surface 122 and aligned with corresponding voltage module terminals. The first and second sets 110,112 are not connected in series by the first conductive portion 126 and the second and third sets 112,114 are not connected in series by the second conductive portion 128 when the connection device 106 is moved away from the array of voltage modules 102 and/or the end surface 122.

Figure 12:
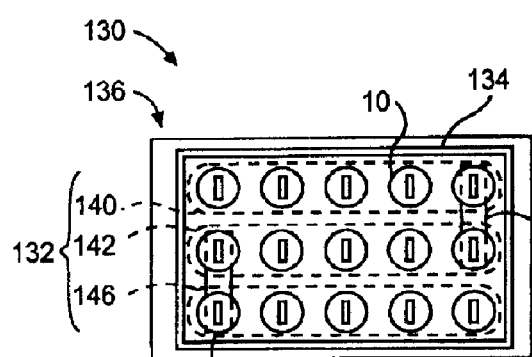
FIG. 12 is a side view of another embodiment of the battery assembly having a connection device disposed in a first position.
Figure 13:
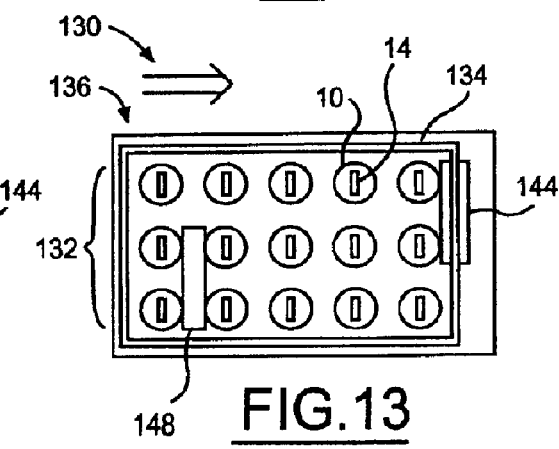
FIG. 13 is a side view of the battery assembly shown in FIG. 12 with the connection device disposed in a second position.
Figure 11:
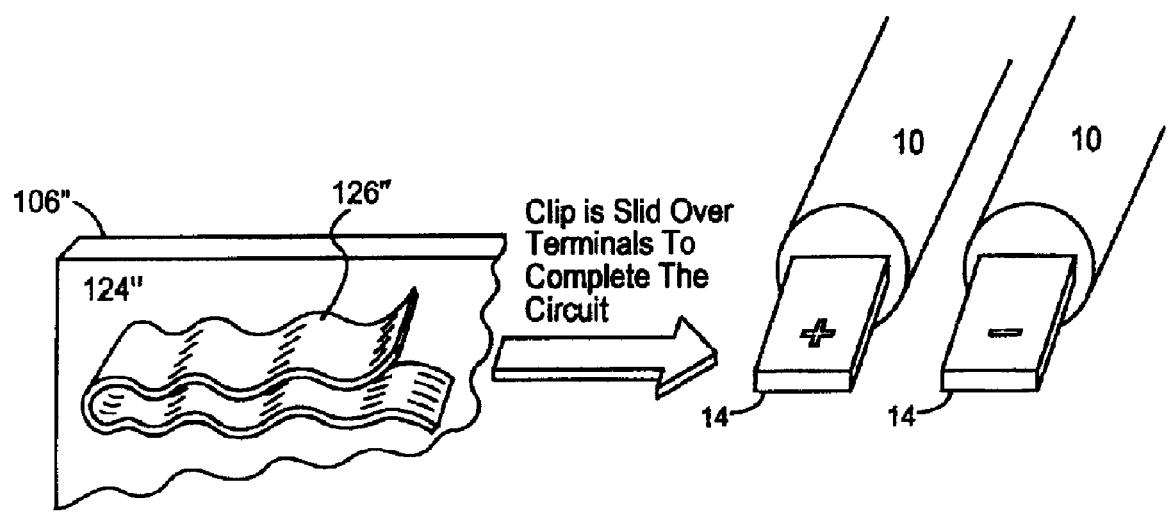
FIG. 11 is a perspective view of another embodiment of a connection device.

Referring to FIGS. 12 and 13, another embodiment of a battery assembly is shown. In this embodiment, the battery assembly 130 includes an array 132 of voltage modules, a housing 134, and a connection device 136. In this embodiment, the connection device 136 has a similar configuration to that shown in FIG. 8, but is configured to move along a surface of the housing 134 between a first position shown in FIG. 12 and a second position shown in FIG. 13.

First and second sets 140,142 of voltage modules are connected in series by a first conductive portion 144 and second and third sets 142,146 are connected in series by a second conductive portion 148 when the connection device 136 is disposed in the first position (FIG. 12). Similarly, the first and second sets 140,142 of voltage modules and second and third sets 142,146 are not connected in series by the conductive portions 144,148 when the connection device 106 is disposed in the second position (FIG. 13).

The connection device 136 may be configured to move in any suitable direction or directions between the first and second positions. For instance, the present invention contemplates embodiments in which the connection device 136 may move in multiple directions to connect and disconnect voltage modules or may move perpendicularly or at an angle to the direction of movement shown in FIGS. 12 and 13.

The present invention allows a battery assembly to be easily and quickly reconfigured to reduce battery output voltage, thereby improving safety and serviceability. Furthermore, at least one embodiment of the present invention may allow battery output voltage to be reconfigured in response to a vehicle impact event to help improve safety. Moreover, the present invention may facilitate servicing and maintenance of a high voltage battery system at a vehicle dealership, thereby reducing service time, reducing associated costs, and/or improving customer satisfaction. Moreover, in at least one embodiment overall repair costs may be reduced since repairs may be made to specific battery assembly components instead of replacing an entire battery assembly.

While the best mode for carrying out the invention has been described in detail, those familiar with the art to which this invention relates will recognize various alternative designs and embodiments for practicing the invention as defined by the following claims.

What is claimed is:

1. A battery assembly for a vehicle, comprising:
a plurality of voltage modules, each voltage module having a terminal; and
a connection device having conductive and nonconductive portions;
wherein the conductive portion contacts the terminals of at least two voltage modules when disposed in a first position and the nonconductive portion contacts at least one terminal of the at least two voltage modules when disposed in a second position.

2. The battery assembly of claim 1 wherein the conductive and nonconductive portions are coaxially disposed.

3. The battery assembly of claim 2 wherein conductive portion has a generally cylindrical configuration and is disposed around a nonconductive core.

4. The battery assembly of claim 2 wherein the connection device further comprises a first end coupled to an actuator adapted to move the connection device between the first and second positions in response to an actuation signal.

5. The battery assembly of claim 1 wherein the conductive portion is disposed adjacent to a plurality of nonconductive portions.

6. The battery assembly of claim 1 wherein the connection device further comprises first and second ends, the first end having a tool engagement feature and the second end having a retention feature.

7. The battery assembly of claim 1 wherein the battery assembly further comprises a housing for receiving the plurality of voltage modules, the housing including first and second apertures, and wherein the connection device further comprises first and second ends, wherein the first and second ends are disposed proximate the first and second apertures, respectively, when the connection device is in the first position.

8. The battery assembly of claim 1 further comprising a housing having a compartment that receives the plurality of voltage modules and wherein the connection device covers the compartment.

9. The battery assembly of claim 8 wherein the conductive portion is disposed proximate a surface of the nonconductive portion that faces the compartment.

10. The battery assembly of claim 1 wherein the conductive portion has a non-planar configuration for providing a biasing force against the terminals of the at least two voltage modules when disposed in the first position.

11. A battery assembly for a vehicle, comprising:
a first set of voltage modules connected in series;
a second set of voltage modules connected in series, the second set differing from the first set;
a housing for receiving the first and second sets of voltage modules, the housing having an end surface; and
a connection device configured to engage the end surface, the connection device having a conductive portion disposed proximate a nonconductive interior surface;
wherein the first and second sets of voltage modules are connected in series when the conductive portion contacts a member of the first set and a member of the second set.

12. The battery assembly of claim 11 wherein the connection device is spaced apart from the end surface when the first set of voltage modules is not connected in series with the second set of voltage modules.

13. The battery assembly of claim 11 wherein the connection device is configured to move along the end surface between a first position in which the conductive portion connects the first and second sets of voltage modules in series and a second position in which the conductive portion is spaced apart from at least one of the first and second sets of voltage modules.

14. The battery assembly of claim 11 wherein a section of the conductive portion protrudes from the nonconductive interior surface.

15. The battery assembly of claim 11 wherein the conductive portion has a corrugated configuration for providing a biasing force against members of the first and second sets of voltage modules when the conductive portion contacts a member of the first set and a member of the second set.

16. A high voltage battery assembly for a vehicle, comprising:
a housing;
first and second sets of voltage modules at least partially disposed in the housing, the members of the first set being connected in series and the members of the second set being connected in series and differing from the members of the first set; and
a connection device having coaxial conductive and nonconductive portions at least partially disposed in the housing;
wherein the connection device moves linearly between a first position in which the conductive portion connects the first and second sets of voltage modules in series and a second position in which the conductive portion does not connect the first and second sets of voltage modules in series.

17. The high voltage battery assembly of claim 16 wherein a member of the first set includes a first terminal having a first terminal aperture and a member of the second set includes a second terminal having a second terminal aperture, wherein the connection device is moveably disposed in the first and second terminal apertures.

18. The high voltage battery assembly of claim 17 wherein the nonconductive portion is disposed proximate at least one of the first and second terminals when disposed in the second position.

19. The high voltage battery assembly of claim 16 wherein the connection device includes a first end coupled to an actuator.

20. The high voltage battery assembly of claim 16 wherein the connection device includes a first end disposed outside the housing that includes a tool engagement feature.

* * * * *

UNITED STATES PATENT AND TRADEMARK OFFICE
CERTIFICATE OF CORRECTION

PATENT NO. : 7,604,896 B2
APPLICATION NO. : 11/161191
DATED : October 20, 2009
INVENTOR(S) : Maguire et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,604,896 B2
APPLICATION NO. : 11/161191
DATED : October 20, 2009
INVENTOR(S) : Patrick Maguire et al.

It is certified that error appears in the above-identified patent and that said Letters Patent is hereby corrected as shown below:

In the Inventors section, please change "Edler" to read --Elder--.

On the Title Page:

The first or sole Notice should read --

Subject to any disclaimer, the term of this patent is extended or adjusted under 35 U.S.C. 154(b) by 1028 days.

Signed and Sealed this

Twelfth Day of October, 2010

David J. Kappos
*Director of the United States Patent and Trademark Office*